United States Patent

Watson et al.

[11] 3,955,398
[45] May 11, 1976

[54] CALIBRATION AND ADJUSTMENT ARRANGEMENT FOR DECELERATION SWITCH

[75] Inventors: Paul H. Watson, Ardara; William J. Linderman, Murrysville, both of Pa.

[73] Assignee: Westinghouse Air Brake Company, Swissvale, Pa.

[22] Filed: May 8, 1975

[21] Appl. No.: 575,528

[52] U.S. Cl. ............................ 73/1 D; 73/516 LM; 200/61.47
[51] Int. Cl.² .................. G01P 21/00; H01H 35/14
[58] Field of Search ............... 73/1 D, 515, 516 LM; 200/61.47, 61.48, 61.49, 61.5, 61.51, 61.45 R; 340/71

[56] References Cited
UNITED STATES PATENTS

| | | | |
|---|---|---|---|
| 1,633,386 | 6/1927 | Rutledge | 200/61.47 |
| 3,022,115 | 2/1962 | Hill et al. | 200/61.47 X |
| 3,846,748 | 11/1974 | Hopwood | 340/71 |

*Primary Examiner*—James J. Gill
*Attorney, Agent, or Firm*—R. W. McIntire, Jr.

[57] ABSTRACT

A decelerometer of the type comprising a tiltable mercury tube deceleration switch carried on a first plate that is pivotally mounted on a second plate which may be secured to a moving object, such as a railway vehicle. A screw mechanism intermediate the first and second plates is arranged to effect adjustment of the degree of tilt of the first plate relative to the second plate in order to accommodate factory calibration of the degree of deceleration which the deceleration switch is intended to sense. The screw mechanism is further arranged to provide upper and lower mechanical stops to limit the range of deceleration adjustment and thereby prevent unauthorized field adjustment of the deceleration sensitivity beyond a safe level, when subsequently installed on a railway vehicle. A reference marking placed on the mercury tube in alignment with the level of mercury therein, when the deceleration switch is factory calibrated at the desired deceleration level serves as a means of properly positioning the decelerometer when installed on the railway vehicle so as to accurately retain the factory calibrated deceleration setting, since the lower limit of the deceleration adjustment locks out the mercury/contact closure of the deceleration switch as a means of obtaining a static zero mph/sec. reference.

8 Claims, 5 Drawing Figures

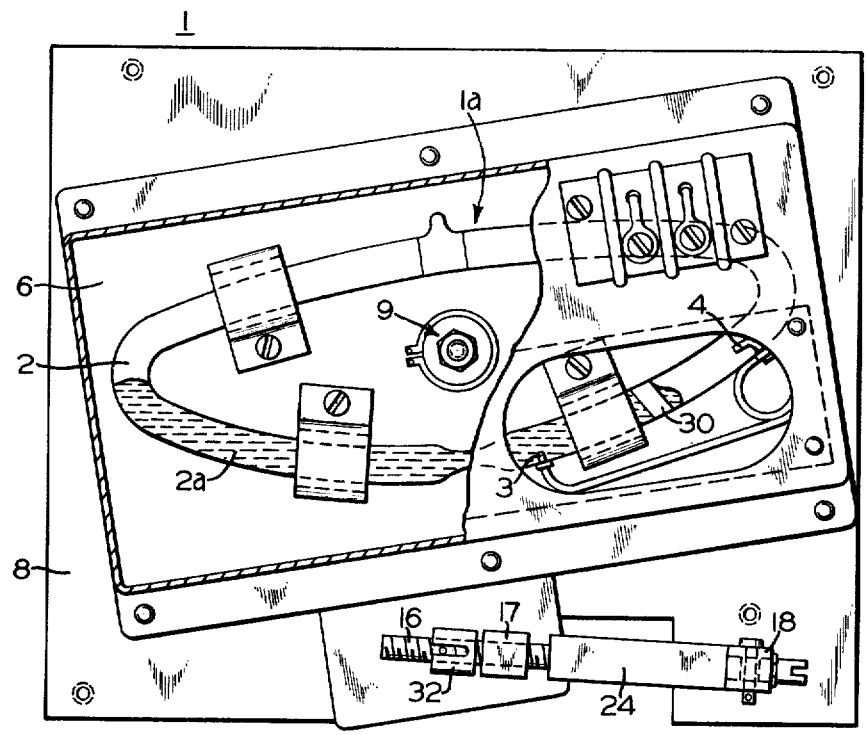
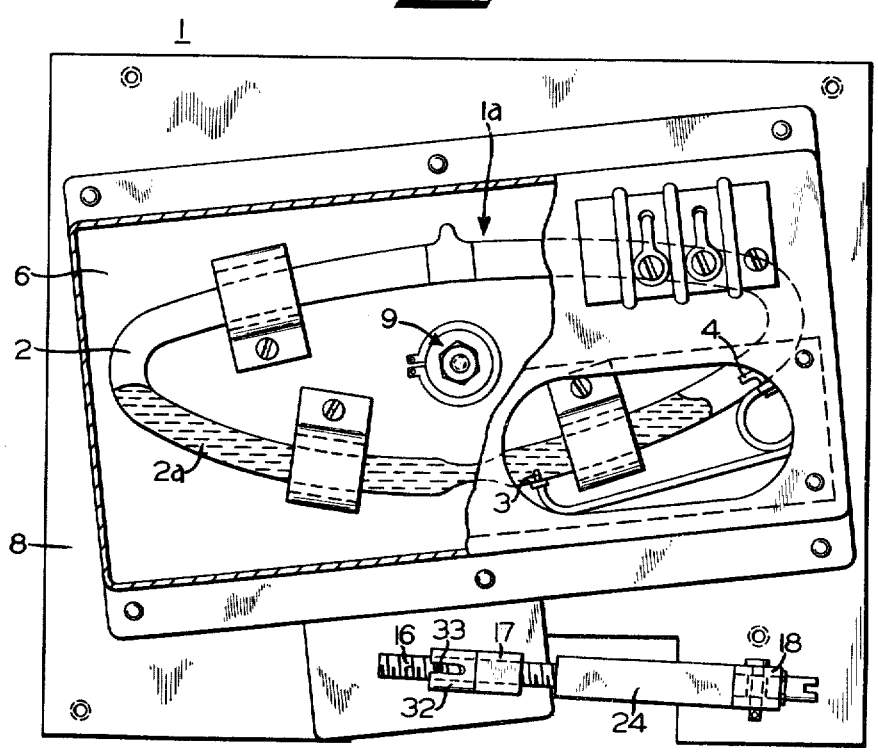

CALIBRATION AND ADJUSTMENT ARRANGEMENT FOR DECELERATION SWITCH

BACKGROUND OF THE INVENTION

The present invention is concerned with inertia type decelerometer switches and particularly such decelerometer switches in which an electrically conductive liquid is confined within a glass tube or the like for the purpose of controlling energization of an electrical circuit including a pair of contact terminals extending into the tube.

One application of a decelerometer switch of this type is in a brake assuring circuit, such as is generally employed on rapid transit type railway vehicles operating in speed restrictive territory under automatic control. The decelerometer switch is used in an external brake control loop to control a back-up, emergency type brake application in the event a minimum deceleration rate fails to materialize during an automatic, speed control initiated brake application intended to reduce the vehicle speed to the speed authorized for the particular speed zone in which the vehicle is operating. In this sense, the minimum deceleration rate at which the decelerometer switch is set to operate is necessarily less than the rate expected to be realized by the automatically initiated brake application. In the event this minimum deceleration rate is not realized, it must be assumed that the automatic controls are malfunctioning and an emergency brake application is therefore necessitated.

It will be appreciated that in order to provide the railroad properties with the latitude to vary this minimum deceleration rate, as may be dictated by their respective operating conditions, an adjustable deceleration range is desirable for the decelerometer switch. However, if the lower limit of this adjustable deceleration range is set too low, the deceleration switch may fail to initiate an emergency brake application until too late. This, of course, dictates that the lower limit of the adjustable deceleration rate be positively maintained at the proper setting by some locking means, in order to prevent tampering by unauthorized personnel and to accordingly avoid an obviously unsafe operating condition of the decelerometer switch. However, locking-in this lower set point of the adjustable deceleration range prevents mercury/contact closure from being used as a reference point and thus requires a different procedure for installing the deceleration switch in the field to obtain switch operation according to the factory calibrated deceleration setting.

SUMMARY OF THE INVENTION

It is accordingly one object of the present invention to provide a mercury type decelerometer switch having adjustable upper and lower set points defining a deceleration range in which the deceleration switch may be set to monitor a predetermined nominal deceleration rate.

Another object of the invention is to lock-in the lower set point of the adjustable deceleration range to prevent unauthorized or inadvertent adjustment of the nominal deceleration rate to an unsafe level.

Still another object of the invention is to utilize the deceleration switch as a common level device during field installation in order to obtain a visual point of reference corresponding to the factory calibrated nominal deceleration rate.

In achieving these aforementioned objects, a decelerometer switch comprising essentially a glass tube partially filled with mercury liquid is secured to an adjustable mounting plate that is in turn rotatably secured to a fixed mounting plate by means of a main pivot. The relative angular position of the two mounting plates may be varied by an adjusting screw that is held captive by two support members, each pivotally mounted on a respective one of the mounting plates. One support member includes a threaded opening to receive the threaded end of the adjusting screw, while the other support member has an opening in which the shank end of the adjusting screw is rotatably retained. By tightening and loosening the adjusting screw, the distance between the two pivotal, screw support members is varied and accordingly the adjustable mounting plate is rotated about its main pivot on the fixed mounting plate to adjust the angular relationship therebetween. The distance between the mercury within the decelerometer switch tube under static conditions and a contact probe thereof is thus varied in accordance with the degree of angularity between the adjustable mounting plate and fixed mounting plate to establish the degree of deceleration required to cause the mercury to flow up the tube sufficiently to make engagement with the contact probe.

In calibrating the decelerometer switch in the factory prior to shipment or field installation, the adjusting screw is rotated in a clockwise direction a predetermined number of turns from the point of contact closure calculated to establish a lower limit of a deceleration range in which the decelerometer switch may be adjusted. A locking sleeve is threaded onto an end of the adjusting screw that projects through the threaded support member and is locked in place to limit adjustment of the screw in a counterclockwise direction beyond this lower limit position of the adjusting screw to prevent unauthorized personnel from altering this lower set point of the deceleration range of the decelerometer switch. A shoulder of the adjusting screw intermediate the two pivotal screw support members is adapted to engage the adjustable mounting plate support member to limit further adjustment of the screw and accordingly establish the upper limit of the adjustable deceleration range.

Now within this deceleration range, the nominal deceleration rate for a particular installation may be readily selected by turning the adjusting screw a predetermined number of turns from the lower limit of the deceleration range, since each turn is known from calculations to correspond to a certain change of the deceleration rate which the decelerometer will detect. A piece of tape or other reference marking may be placed on the glass tube in alignment with the mercury to provide a visual indication of the selected nominal deceleration rate to be monitored.

In subsequently installing this decelerometer switch on a railway vehicle, for example, the decelerometer switch is used as a common level to assure that the accuracy of the factory calibrated nominal deceleration rate is retained. This is, the mounting position of the fixed mounting plate is varied until the mercury is aligned with the reference marking on the glass tube and then is secured in position so that the rate of deceleration capable of being detected conforms to the nominal deceleration rate set during factory calibration.

Other objects and advantages of this invention will become apparent from the following more complete explanation, when taken with the accompanying drawings of which:

FIG. 4 is a plan view of the decelerometer shown adjusted to monitor a predetermined deceleration rate; and FIG. 5 is a plan view of the decelerometer shown in one extreme position of its deceleration adjustment range.

DESCRIPTION AND OPERATION

Figure 1:
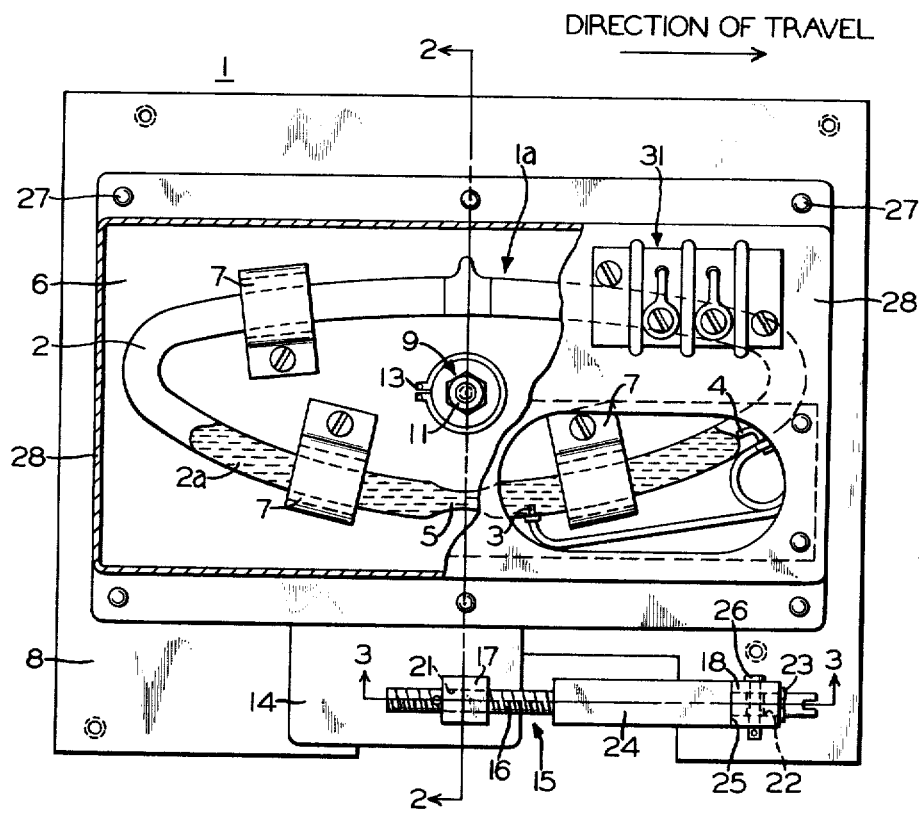
FIG. 1 is a plan view showing an assembly of the decelerometer comprising the invention.

Referring now to FIG. 1 of the drawings, there is shown a decelerometer device 1, the heart of which is a deceleration switch 1a comprising an eliptically shaped, transparent glass tube 2 partially filled with an electrically conductive liquid 2a, such as mercury, the color of which makes it readily visible in tube 2. Molded into tube 2 is a pair of spaced-apart electrical probes 3 and 4, the former being located near the lower-most portion of tube 2 so as to be normally immersed in the mercury and the other located along the side of tube 2, so as to be in contact with the mercury only when the momentum of the vehicle on which the decelerometer 1 is mounted causes the liquid to flow or slosh toward the side of tube 2 corresponding to the direction of vehicle travel, as indicated by the arrow associated with FIG. 1. A narrowed section 5 is formed in the lower portion of tube 2 to somewhat delay the action of the mercury in making and breaking engagement with probe 4 to obtain hysteresis in the switch operation for stability purposes. Decelerometer switches of the above-described type are generally well-known and conventional and should therefore be well understood without any further discussion.

Figures 2, 3:
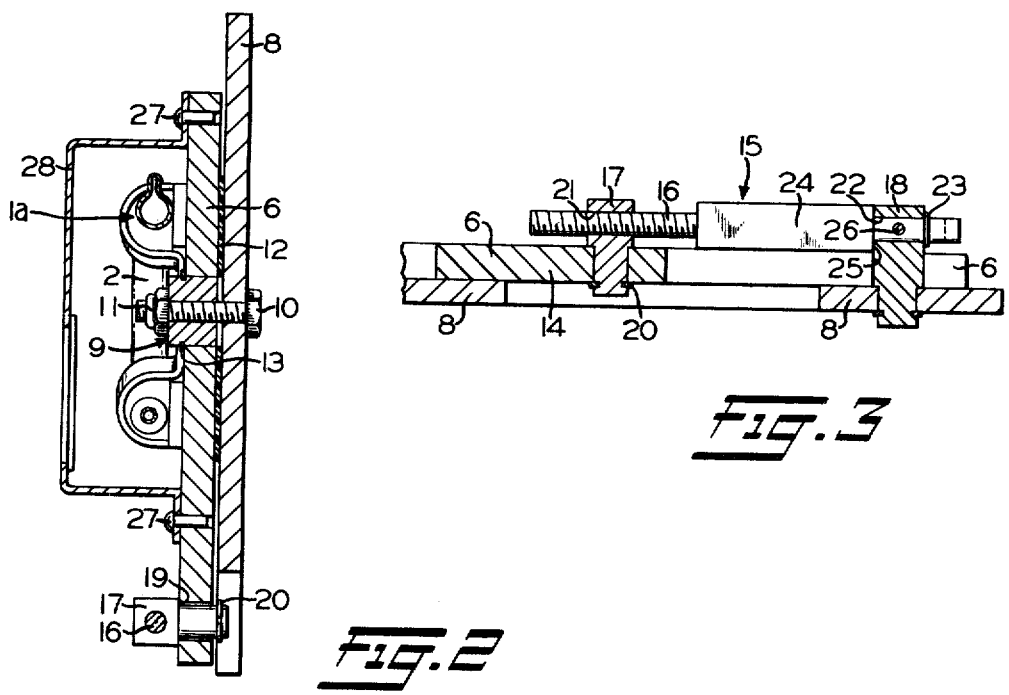
FIG. 2 is a section view of the decelerometer taken along the line 2—2 in FIG. 1.
FIG. 3 is a partial section view of the adjusting screw mechanism of the decelerometer taken along the lines 3—3 in FIG. 1.

Tube 2 is fastened to an adjustable mounting plate 6 by a plurality of clips 7, which may include sponge pads or the like to cushion tube 2 against shocks. Adjustable plate 6 is in turn carried on a fixed mounting plate 8, being rotatable about a main pivot member 9 that is held on the face of fixed mounting plate 8 by a screw 10 and lock nut 11, as seen in FIG. 2. A teflon washer 12 is also mounted on pivot member 9 and acts as a bearing between plates 6 and 8 to reduce friction and assure smooth, easy adjustment of the relative angularity between deceleration switch 1a and mounting plate 8, as hereinafter explained. A snap ring 13 secures the adjusting plate 6 and washer 12 on main pivot member 9.

Arranged between an extension 14 of adjustable plate 6 and mounting plate 8 is an adjusting mechanism 15 comprising a screw 16 and pivot blocks 17 and 18 carried respectively on plates 6 and 8, as clearly seen in FIG. 3. Pivot block 17 is formed with a shoulder 19 that provides a bearing surface that rides against the face of plate 6 to which the pivot block is secured by means of a snap ring 20. Pivot block 17 is further formed with a screw threaded opening 21 to receive the threaded end of screw 16. The opposite end of screw 16 passes through an opening 22 in pivot block 18, which is retained in plate 8 in the same manner as pivot block 17 is retained in plate 6. The shank end of screw 16 includes a snap ring 23 that abuts one side of pivot block 18 to prevent axial movement of screw 16 in a leftward direction. Formed integral with the shank end of screw 16 intermediate pivot blocks 17 and 18 is a stop member 24 having a shoulder 25 that abuts the other side of pivot block 18 to prevent axial movement of screw 16 in a rightward direction. Screw 16 is thus free to rotate in opening 22 of pivot block 18 without longitudinal movement in either direction in order to effect angular adjustment between plates 6 and 8. A locking pin 26 may be inserted through an aligned opening in screw 16 and pivot block 18 to maintain the relative positions of plates 6 and 8 when the desired angular adjustment has been made.

Permanently secured to adjustable plate 6 by pop rivets 27 is a cover 28 to prevent tampering and damage to deceleration switch 1a. Provided in cover 28 is an opening 29 through which the mercury liquid 2a and a reference marking 30 on tube 2 may be viewed, as seen in FIG. 4 and hereinafter explained. Also mounted on cover 28 is a terminal block 31 to which lead wires from contact members 3 and 4 are connected.

While decelerometer devices of the above-described type may be used for a variety of applications in a well-known manner, the present decelerometer device and the adjustable feature thereof will be explained in connection with a brake assurance circuit which is primarily intended to assure that the speed of a railway vehicle operating in speed control territory is reduced at a rate sufficient to indicate that the vehicle brakes are operative responsive to a brake command by the automatic speed control equipment. In this regard, contacts 3 and 4 of deceleration switch 1a are arranged in an emergency brake control circuit, which prevents the emergency brakes from being applied on the vehicle as long as the inertia of the mercury in tube 2 is such that the mercury assumes a position in which both contacts are immersed by the mercury. It will be appreciated that the amount of inertia to which the mercury is subjected is predicated on the rate of vehicle deceleration. Should the deceleration accordingly fall below a rate sufficient for the mercury to "make" both contacts 3 and 4, an emergency brake application will be initiated, thereby assuring that the vehicle is brought to a halt before a collision occurs. It will be understood therefore that the deceleration switch of the brake assurance circuit is adjusted for a brake rate somewhat less than the actual brake rate desired in order to provide an emergency stop in the event the desired deceleration required to reduce the vehicle speed to a zone authorized speed is not realized, due for example, to a malfunction of the automatic train control equipment.

The deceleration rate to be monitored by deceleration switch 1a is normally calibrated in the factory prior to field installation, so that each decelerometer device 1 for a given system equipment can be precisely matched. In order to accommodate different deceleration rates, the decelerometer switch must be provided with an adjustment whereby the desired deceleration rate can be chosen within a preselected range. If the lower limit of this preselected range is too low, however, the deceleration switch 1a, when used in conjunction with a brake assurance circuit of the above-discussed type, could obviously fail to render the brake assurance circuit operative at a point in time sufficient to prevent an impending collision. For this reason, decelerometer device 1 is initially calibrated in accordance with the desired minimum set point of the deceleration adjustment range and thence locked in so that the minimum set point cannot be inadvertently altered by unauthorized personnel, particularly during field installation.

In order to accomplish this, the fixed mounting plate 8, is secured on a level fixture of any suitable type and adjustable mounting plate 6, on which the deceleration switch 1a is carried, is rotated relative to plate 8 by removing lock pin 26 and turning screw 16 until the liquid mercury 2a in tube 2 just makes initial contact with probe 4 representative of a 0 mph/sec. rate of deceleration, as shown in FIG. 1. From this point, known as the zero reference, screw 16 is further rotated in a clockwise direction (assuming right-hand threads of screw 16) a preselected number of turns of change the angular relationship between the adjustable and fixed mounting plates 6 and 8. Accordingly, the mercury in tube 2 is shifted away from electrical probe 4 a certain distance corresponding to a minimum permissible deceleration rate. If each complete turn of screw 16 changes the deceleration rate capable of being monitored by the deceleration switch by 0.2 mph/sec., for example, such value being determined by calculations and/or trial, then a minimum permissible deceleration rate of 1.5 mph/sec. would require exactly 7½ complete turns of screw 16.

When this minimum permissible deceleration adjustment has been accomplished, as shown in FIG. 5, a locking sleeve 32 is threaded onto the end of screw 16 until it abuts pivot block 17, at which point the sleeve 32 is locked to screw 16 by means of a roll pin 33. This establishes a limit stop which prevents any counterclockwise rotation of screw 16 beyond this set point in order to positively define the minimum permissible deceleration rate for which the deceleration switch can be set. In limiting adjustment of this minimum permissible deceleration rate beyond a predetermined point corresponding to a minimum safe value, unauthorized personnel are prevented from making improper deceleration rate adjustments which could result in unsafe operation of the deceleration switch.

Continued clockwise rotation of screw 16 will effect further rotation of adjustable plate 6 and consequently increase the distance separating electrical probe 4 from the mercury in tube 2 until the shank portion 24 of screw 16 contacts pivot block 17 to establish a limit stop for the maximum permissible deceleration rate for which the deceleration switch may be set.

Consequently, a predetermined adjustment range is provided in which the nominal deceleration rate to be monitored by deceleration switch device 1 may be calibrated by rotating screw 16 in either a clockwise or counterclockwise direction from the respective limit stops.

However, it will be understood that in order to retain the same exact deceleration setting when mounting the calibrated deceleration switch in the field without requiring special tools, such as a level for example, some point of reference other than the aforementioned zero reference point, must be obtained, since the minimum permissible deceleration limit stop provided by locking sleeve 32 prevents the deceleration switch from being returned to the zero reference position.

In calibrating the desired deceleration rate so as to obtain a 2.0 mph/sec. rate, for example, screw 16 is rotated the proper number of turns in a clockwise direction from the minimum permissible deceleration setting and a reference mark 30, such as paint or tape, is placed on tube 2 in alignment with the mercury, as shown in FIG. 4 to obtain a visual point of reference.

Locking pin 26 is reinserted through pivot block 18 and screw 16 to lock the deceleration setting of the deceleration switch at the preselected 2.0 mph/sec. rate.

It should be appreciated now that in mounting this calibrated deceleration switch on a railway car, for example, the integrity of the deceleration rate for which the switch is calibrated is assured by placing the railway car on a level section of track and securing the fixed mounting plate of the deceleration switch in place on the car so that the mercury in tube 2 is aligned precisely with the edge of the visual reference mark 30. In this sense, the decelerometer switch itself serves as a level and no special tools are required to properly level and mount the deceleration switch, so as to maintain the accuracy of the zero reference point without actually being able to utilize the zero reference point setting, due to the minimum permissible limit of the deceleration range.

From the foregoing, it will be apparent that once initial factory calibration of the deceleration rate is complete, the decelerometer device requires no measuring insruments, special tools or skilled personnel to accomplish field installation in a manner which maintains the integrity of the factory calibration, thus resulting in reduced manufacturing costs and easier maintenance, while providing for high reliability. Furthermore, the limit stop defining the minimum deceleration rate at which the decelerometer is set prevents railway maintenance personnel etc. from making improper adjustment of the deceleration rate below a safe level and thus guarantees the integrity of a brake assurance circuit designed to produce an emergency brake application in the event the railway vehicle deceleration is inadequate, which is, in the present case, less than the 2.0 mph/sec. deceleration rate that the decelerometer is set to monitor.

Having now described the invention what we claim as new and desire to secure by Letters Patent, is:

1. A decelerometer including:
   a. switch means for monitoring a predetermined rate of deceleration of a moving body, said switch means comprising:
      i. a container partially filled with an electrically conductive liquid; and
      ii. a pair of electrical contacts extending into said container, one of said contacts being located so as to be continuously immersed in said liquid and the other of said contacts being located in spaced relation with said liquid under static conditions of said decelerometer and engageable with said liquid only when said decelerometer is subject to at least said predetermined rate of deceleration;
   b. a first mounting plate to which said switch means is secured;
   c. a second mounting plate to which said first mounting plate is pivotally connected; and
   d. adjustment means intermediate said first and second mounting plates for effecting rotation of said first mounting plate about said pivot connection comprising:
      i. a first support block on said first mounting plate;
      ii. a second support block on said second mounting plate;
      iii. an adjusting screw having one end threadedly connected with and extending through said first support block and a shank portion rotatably retained in an opening of said second support block, whereby operation of said screw varies the distance between said first and second support blocks to cause said rotation of said first mounting plate about said pivot connection and to accordingly vary the distance said liquid is spaced from said other of said contacts; and iv. a locking sleeve threadedly connected to the end of said screw so as to engage said first support block and thereby limit rotation of said first mounting plate in a direction which decreases the distance between said liquid and said other of said contacts.

2. A decelerometer as recited in claim 1, further characterized in that the shank portion of said screw abuts said first support block and thereby limits rotation of said first mounting plate in a direction which increases the distance between said liquid and said other of said contacts.

3. A decelerometer as recited in claim 1 further comprising a reference mark on said container in alignment with the liquid therein when said first mounting plate is rotated in accordance with said predetermined deceleration rate to thereby provide a visual reference for determining the proper position at which said decelerometer should be mounted for operation on the moving body.

4. A decelerometer as recited in claim 3, further characterized in that said container is transparent to permit viewing said liquid therein and thereby facilitate alignment of said liquid with said reference mark.

5. A decelerometer as recited in claim 4, further characterized in that said container is a closed tube of generally elliptical shape.

6. A decelerometer as recited in claim 1, further characterized in that said first and second support blocks are pivotally fixed on said first and second mounting plates, respectively.

7. A decelerometer as recited in claim 1 wherein said locking sleeve is provided with an elongated slot and the threaded end of said screw is provided with an opening to receive a pin via said elongated slot so as to prevent rotation of said locking sleeve on said screw, thereby locking the axial position of said locking sleeve along said screw.

8. A decelerometer as recited in claim 1 wherein said adjustment means further comprises means for locking said screw against rotation.

* * * * *